No. 769,401. PATENTED SEPT. 6, 1904.
E. J. PENNINGTON.
RUNNING GEAR FOR VEHICLES.
APPLICATION FILED JAN. 18, 1904.
NO MODEL.

Witnesses
Sidney P. Hollingsworth
C. B. Bull

Inventor
Edward J. Pennington,
by G. H. W. T. Howard,
Attorneys.

No. 769,401. Patented September 6, 1904.

UNITED STATES PATENT OFFICE.

EDWARD J. PENNINGTON, OF CLEVELAND, OHIO, ASSIGNOR TO WILLIAM J. MORGAN AND ARTHUR F. MAY, OF CLEVELAND, OHIO.

RUNNING-GEAR FOR VEHICLES.

SPECIFICATION forming part of Letters Patent No. 769,401, dated September 6, 1904.

Application filed January 18, 1904. Serial No. 189,532. (No model.)

*To all whom it may concern:*

Be it known that I, EDWARD J. PENNINGTON, of Cleveland, in the county of Cuyahoga and State of Ohio, have invented certain new and useful Improvements in Running-Gear for Vehicles, of which the following is a specification, reference being had to the accompanying drawings and to the numerals of reference marked thereon.

My invention has more especial reference to automobiles, and employs with the axle and wheel a simple and reliable ratchet-and-spring mechanism which enables the wheel to run around curves without sliding and to more readily pass over obstructions without shock to the body of the vehicle and admits of the change of the driving action from one wheel of an axle to its other wheel as occasion requires, thus automatically applying the power in the most effective manner.

My invention also provides means whereby the wheel if momentarily checked by meeting an obstruction is given an impetus, aiding its action in restarting.

Figure 1:
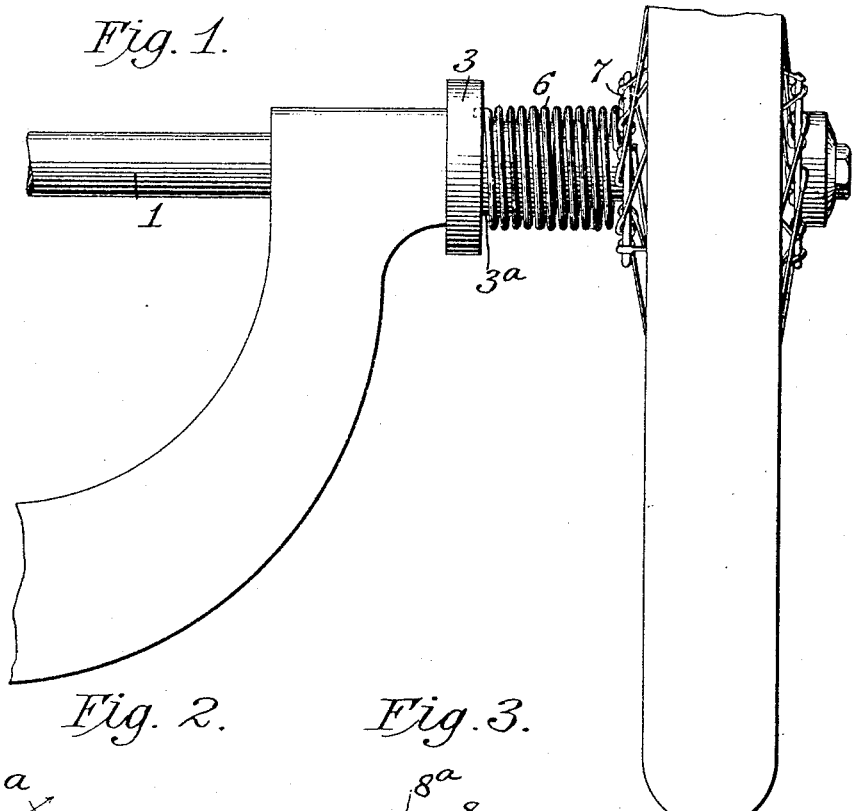
Figure 2:
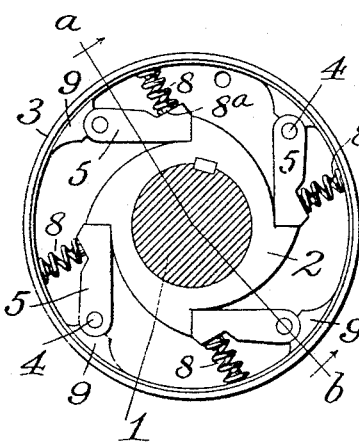
Figure 3:
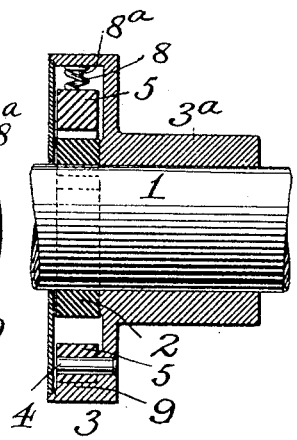
Figure 4:
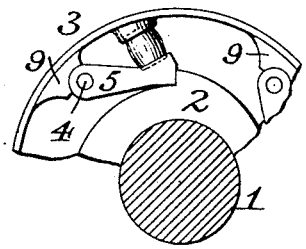

In the accompanying drawings, Figure 1 is a plan view showing my invention. Fig. 2 is a detached detail. Fig. 3 is a longitudinal section on the line $a\ b$ of Fig. 2. Fig. 4 shows a modification.

Similar numerals of reference indicate similar parts in the respective figures.

1 is the axle, here shown as the front one of an automobile such as is described in my applications Serial Nos. 189,534 to 189,537, both inclusive, and filed of even date herewith, although my invention is adapted to machines of different type or to any ordinary vehicle. To the axle 1 is keyed a ratchet-wheel 2, having preferably four teeth, as shown.

3 is the ratchet-case, which turns loosely upon the axle. Within the ratchet-case, at 4 4, are pivoted pawls 5, adapted to engage the teeth of the ratchet. Formed as a part of the ratchet-case 3 is an elongated sleeve $3^a$, around which is coiled a spring 6, one end of which is secured to the case 3, while the opposite end of said spring is attached to the hub 7 of the wheel.

The driving is effected through the medium of the ratchet-wheel acting upon the pawls, they transmitting the drive to the case, which elastically imparts its movement to the wheel. In turning a curve of comparatively short length the springs will yield, allowing for the difference in the travel of the wheels; but should the vehicle be run on a curve for a longer period the pawls of the outer wheel will be made free to revolve at the same speed as that of said wheel, while the ratchet will rotate at the same speed as that of the inner wheel, the latter now doing the driving transmitted from the engine. The pawls 5 are maintained in contact with the ratchet-wheel by springs 8, which may be of spiral form, as indicated in Fig. 2, they being fitted over projections $8^a$, formed, respectively, on the ratchet-case and pawls, or the springs may be of rubber, as seen in the modification, Fig. 4, in which the spring is shown inserted in a pocket cast in the ratchet-case. The strain upon the pawl may be relieved by means of an abutment 9. It is thus seen that my invention is entirely automatic in its action; that the connection between the axle, being an elastic one, insures ease of travel regardless of obstructions met with in the road; that a certain impetus due to the reaction of the spring is given to the wheel, aiding it in restarting when temporarily checked, and that, as occasion requires, the driving force is transferred from one wheel of the axle to the other, thus equalizing wear and placing the power where it is most effective in the propulsion of the vehicle.

The device is right and left at the respective ends of the axle.

I do not restrict myself to the exact details of construction and combination herein described and shown, as they may be varied by the skilful mechanic without departing from the spirit of my invention, and such changes as may suggest themselves to others not involving invention I consider within the terms of my claims.

Having described my invention, I claim—

1. In running-gear for vehicles, the combination of an axle and a wheel, a ratchet keyed to the axle, a ratchet-case loosely mounted upon said axle, pawls carried by the casing, and a coil-spring connecting the casing and the wheel, substantially as set forth.

2. In running-gear for vehicles, the combination of an axle and a wheel, a ratchet keyed to the axle, a ratchet-case loosely mounted upon said axle and having an elongated sleeve, a coil-spring surrounding said sleeve and having one end secured to the ratchet-case, the other end of said spring being secured to the hub of the wheel, substantially as set forth.

3. In running-gear for vehicles, the combination of an axle and a wheel, a ratchet keyed to the axle, a ratchet-case loosely mounted upon said axle, pawls carried by the casing, a coil-spring connecting the casing and the wheel, and springs within the casing adapted to bear upon the pawls, substantially as set forth.

In testimony whereof I hereunto set my hand and seal.

EDWARD J. PENNINGTON. [L. S.]

Witnesses:
G. H. HOWARD,
S. T. BROOKS.